United States Patent

Sing

Patent Number: 5,228,521
Date of Patent: Jul. 20, 1993

[54] PLANT REMOVING, MOWING AND TRIMMING APPARATUS

[76] Inventor: Peter Sing, P.O.Box 11532, Winslow, Wash. 98110

[21] Appl. No.: 783,258

[22] Filed: Oct. 28, 1991

[51] Int. Cl.$^5$ ............................................. A01B 33/06
[52] U.S. Cl. ........................................ 171/53; 172/59; 172/111
[58] Field of Search ................... 172/41, 110, 111, 25, 172/329, 46, 48, 49; 56/327.1; 171/50, 53, 57; 366/343, 342, 318, 320, 323

[56] References Cited

U.S. PATENT DOCUMENTS

| | | | |
|---|---|---|---|
| 372,282 | 10/1887 | Winter | 366/343 |
| 1,166,135 | 12/1915 | Lamp | 172/59 |
| 1,506,042 | 8/1924 | Bauer | 172/59 |
| 2,905,453 | 9/1959 | Wise | 366/343 |
| 2,983,322 | 5/1961 | Heeren | 172/523 |
| 3,084,748 | 4/1963 | Heeren et al. | 172/59 |
| 3,129,771 | 4/1964 | Lidstone | 172/111 |
| 4,575,255 | 3/1986 | Kafka | 366/343 |
| 4,804,439 | 2/1989 | Fredricksson | 366/320 |

FOREIGN PATENT DOCUMENTS

| | | | |
|---|---|---|---|
| 1366091 | 1/1988 | U.S.S.R. | 171/53 |
| 685495 | 1/1953 | United Kingdom | 366/342 |

Primary Examiner—Randolph A. Reese
Assistant Examiner—Spencer Warnick
Attorney, Agent, or Firm—Nathaniel Altman

[57] ABSTRACT

A helical coil assembly, consisting of spaced coil turns mounted on a shaft at right angles to the coil, is rotated by any suitable power source. Any plant growth stalks in the path of this rotating coil enter and are caught in the channel between the spaced coil turns, spun centripetally, clumped together, grasped and pulled by the coil so that the plant growth, whether crops or undesirable weeds, undergrowth, etc. is removed by its roots. The helical coil assembly may also include a cutting blade rotating parallelly and adjacent to the helical coil, for severing the clumped plant stalks held under tension by the coil, thus moving or trimming the plant growth. Multiple coil assemblies, arranged in various groupings, are combined for a wide range of mowing, trimming, harvesting or removing purposes.

19 Claims, 3 Drawing Sheets

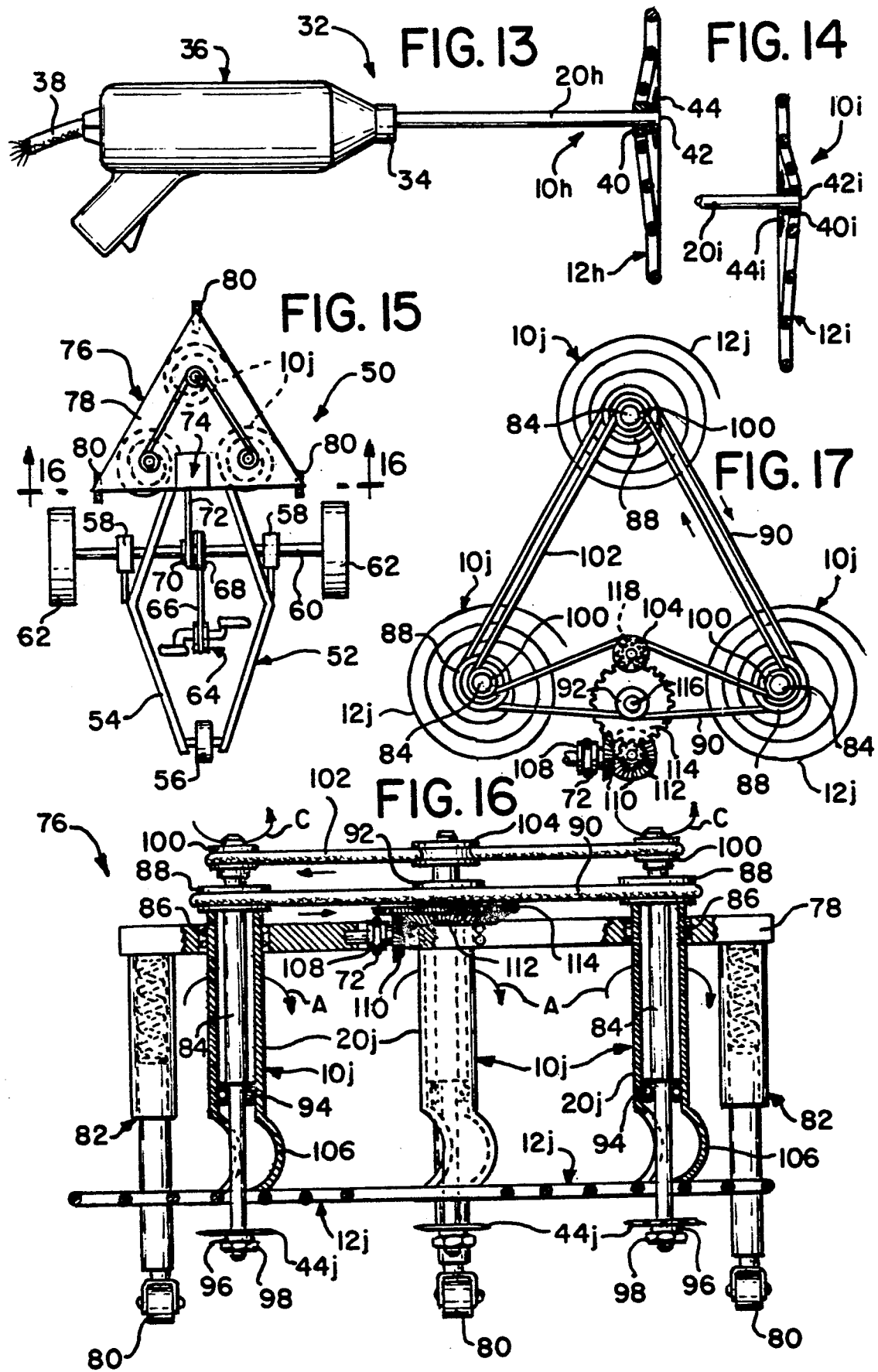

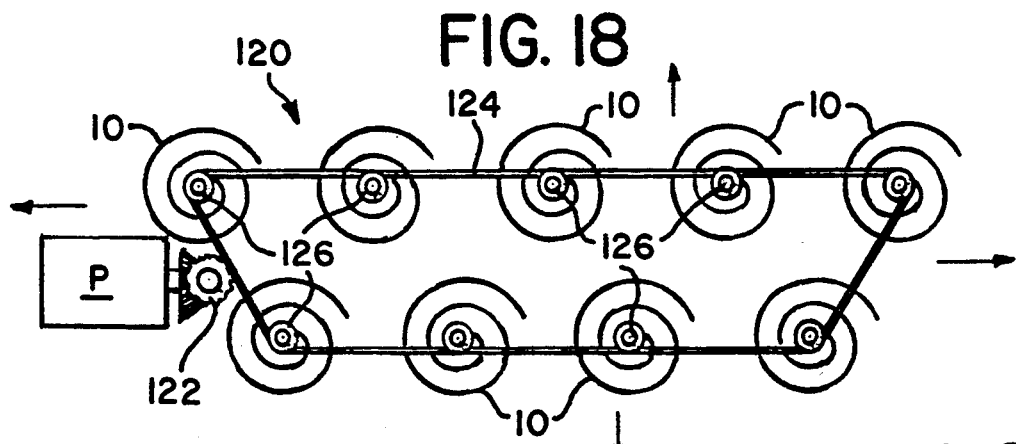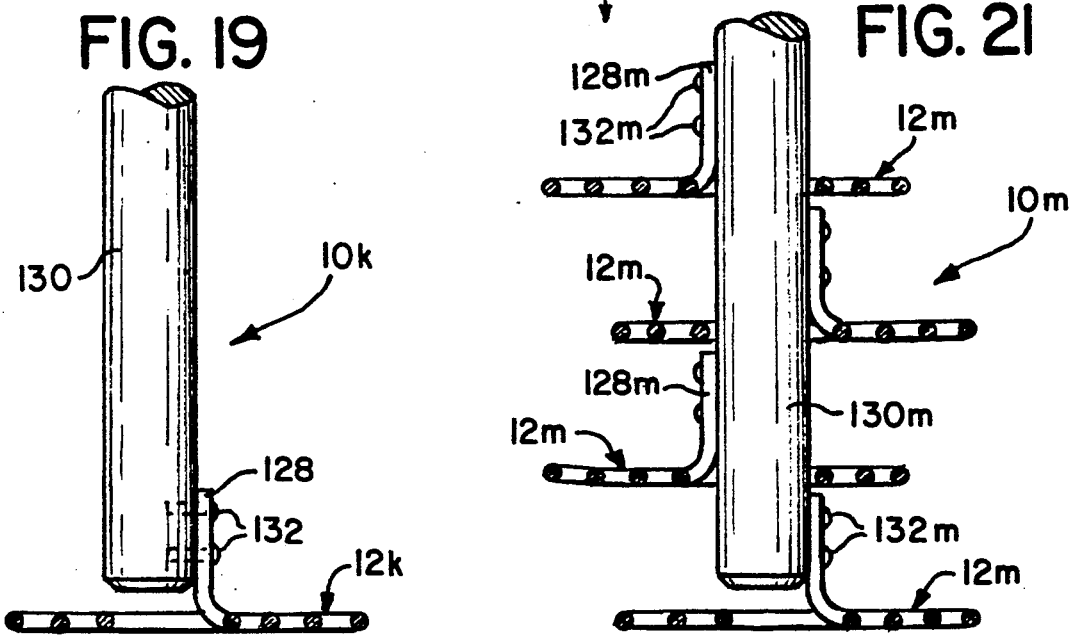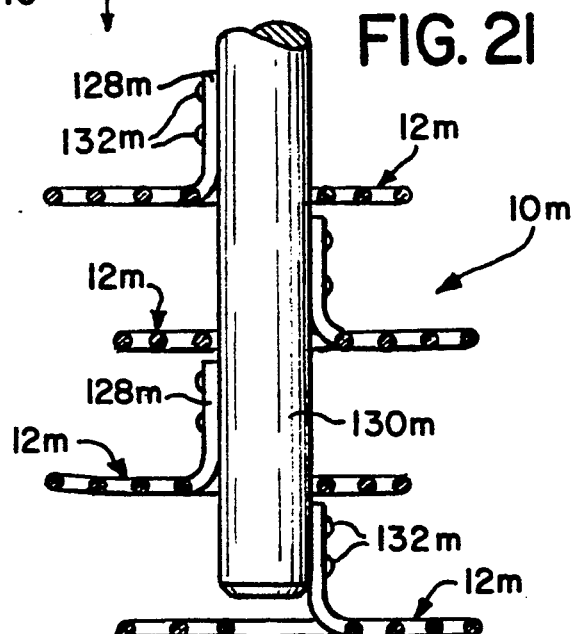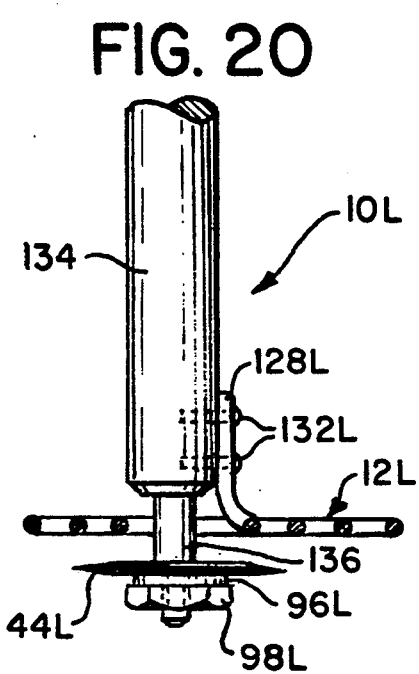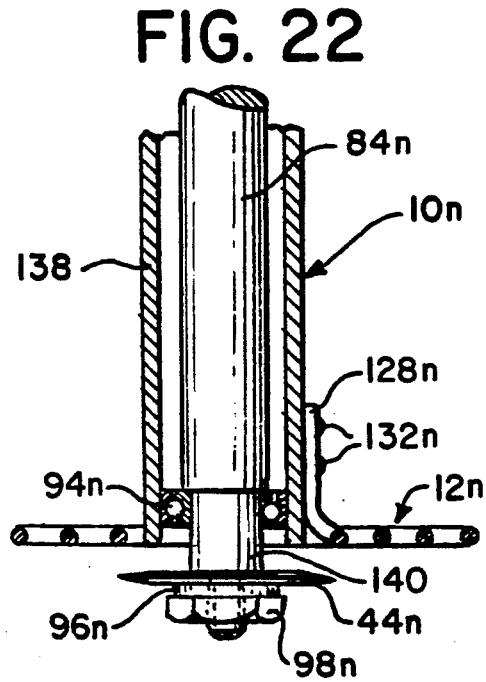

PLANT REMOVING, MOWING AND TRIMMING APPARATUS

FIELD OF THE INVENTION

This invention relates to agricultural apparatus for both home and farm use. More particularly, it relates to apparatus for mowing, reaping, cutting, trimming or removing various plant growths or crops such as grain, grass, hedges, peanuts, other root vegetables, etc.

BACKGROUND OF THE INVENTION

Mowing and cutting machines in current use for both home lawns and farm crops, operated by hand or power-driven, are well known and widely used. Whether it is a typical hand lawn mower, with its horizontal rollers carrying long spirally-mounted blades, or a standard disk-type mowing machine powered by a diesel engine which rapidly rotates a two-foot-long blade, all these mowers carry their cutting blades close to the ground and are vulnerable to frequent blade dulling or damage from stones or other hard objects encountered. As a consequence, either inefficient uneven mowing, tough growths being left behind and tender grass being sheared and mangled rather than cut, or high maintenance costs for sharpening or replacement result. Other shortcomings in driven mowers are that they are largely powered excessively for the work to bo done, creating energy waste along with noise and air pollution.

To overcome these deficiencies in the prior art, it is a primary object of this invention to provide an efficient inexpensive apparatus for mowing, cutting, trimming and removing various plant growths. Another object of this invention is to provide an apparatus useful in pulling out by the roots not only underground crops but also undesirable undergrowth, weeds and even underwater algae. Still another object of this invention is to provide a plant reaper and lawn mower of simple structure, easy to operate and maintain and with comparatively little or no noise or air pollution.

SUMMARY OF THE INVENTION

The fundamental concept of this invention comprises a rigid substantially flat spiral coil or helix, its turns spacedly extending from a central coil generating point to a free outer end. The space between the coil's turns constitutes an open path or channel with an access opening at the outer end. Attached to the inner end of the coil is a shaft positioned at right angles to the plane of the spiral coil, the shaft and coil to be rotated in the direction of coil generation. In use, when the spiral coil is thus rotated and moved among growing plant stalks or the like, the stalks are caught in the coil's access opening and forced centripetally into the coil's spiral path, clumped together, firmly grasped and subjected to strong tension thereby.

When the spiral coil of this invention is used for removal by the roots of underground crops or unwanted growths (weeds, underbrush, algae), enough tension can be generated by continued coil rotation and movement to remove the plant growths completely. Alternatively, when mowing, cutting and trimming operations are desired, cutting blade means may be combined and rotated simultaneously with the helical coil, the cutting blade being to cut plant stalks or grass while they are in the grasp of the coil.

Spiral coils of this invention may be used individually, as in a hedge trimmer, or combined to operate in unison with a single power source in rows, groups or clusters for mowing lawns or reaping crops.

This invention will be more fully disclosed, described and clarified in full detail in connection with the accompanying drawings of the preferred embodiments, which are illustrative and not limiting.

SHORT FIGURE DESCRIPTION OF THE DRAWINGS

FIG. 13 is a side elevational view, partly in section, of a device for trimming or cutting plant growths in accordance with this invention;

FIG. 14 is a sectional view of a modified form of the spiral coil assembly illustrated in FIG. 13;

FIG. 15 is a somewhat schematic top plan view of a pedal-operated mowing apparatus in accordance with this invention;

FIG. 16 is a sectional view taken along lines 16—16 of FIG. 15;

FIG. 17 is a schematic plan view of the drive mechanism of the mower of FIGS. 15 and 16;

FIG. 18 is a schematic plan view of an expanded mowing apparatus in accordance with this invention; and FIGS. 19, 20, 21 and 22 are sectional views of other spiral coil assemblies for use in the practice of this invention.

DESCRIPTION OF THE PREFERRED EMBODIMENTS

Figure 1:
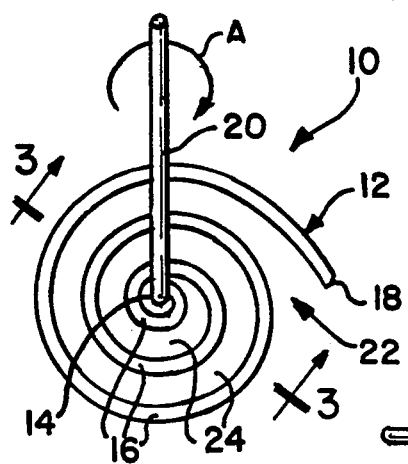
FIG. 1 is a front top perspective view of a helical coil assembly in accordance with this invention.
Figure 2:
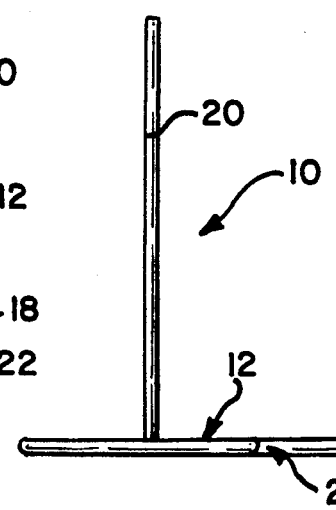
FIG. 2 is a front elevational view of the spiral coil assembly of FIG. 1.
Figure 3:
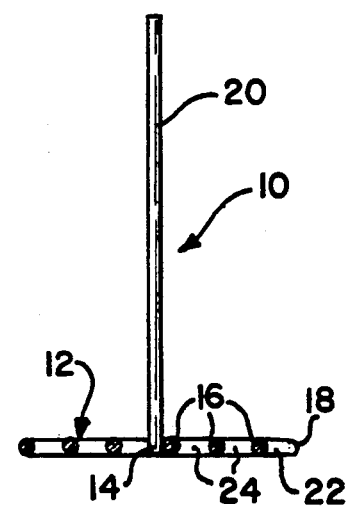
FIG. 3 is a sectional view taken along line 3—3 of FIG. 1.

The spiral coil assembly 10 shown in FIGS. 1-3 comprises the rigid planar helical coil element 12, which spirals outwardly and spacedly from its inner end 14 through turns 16 to outer free end 18. Inner end 14 is attached to shaft 20 either integrally, as shown here, or secured thereto (see FIGS. 19-21) in perpendicular alignment to the plane of coil element 12. The configuration of spiral coil 12 creates access opening 22 leading to spiral passage or channel 24. When shaft 20 is rotated by any suitable motive means in the direction of arrow A, the helical coil 12 is spun in the same direction and any plant growth in its path enters access opening 22 and is whipped centripetally along spiral channel 24 and clumped together as the plant stalks are firmly grasped within coil turns 16. Undesirable plants such as weeds, underbrush and even underwater algae can thus be removed by their roots as the tension and pulling action of rotating coil assembly 10 increases as it is moved by its operator; the same action may be used successfully in the harvesting of such plants as peanuts and other underground crops.

Figure 4:
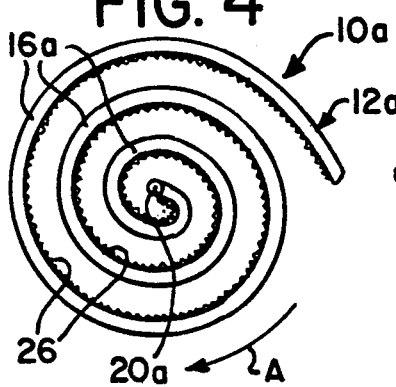
FIG. 4 is a top plan view of another embodiment of the spiral coil assembly.
Figure 5:
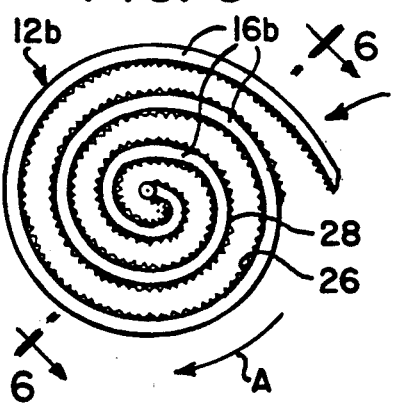
FIG. 5 is a top plan view of still another embodiment of a spiral coil assembly.
Figure 6:
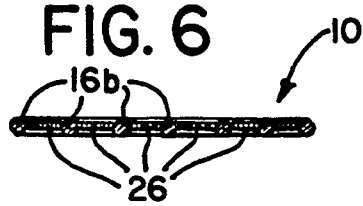
FIG. 6 is a sectional view taken along line 6—6 of FIG. 5.

FIG. 4 illustrates a spiral coil assembly 10a which differs from assembly 10 of FIGS. 1-3 only in the fact that the inner surface 26 of coil 12a is toothed or serrated to provide more secure plant-grasping power. The coil assembly 10b of FIGS. 5 and 6 has both inner surfaces 26 and 28 serrated for still surer plant-grasping power.

Figure 7:
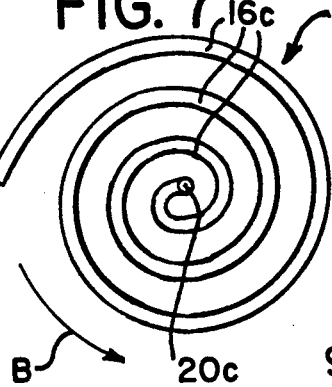
FIG. 7 is a top plan view of a variation of the spiral coil assembly of FIGS. 1-3.

FIG. 7 shows a helical coil assembly 10c which is a mirror-image of assembly 10 in FIGS. 1-3; here shaft 20c is rotated in the counterclockwise direction of arrow B to operate coil assembly 10c. It should be evident that coil assemblies 10 and 10c are fully equivalent in function and effectiveness, and may be used interchangeably or combined when multiple coil assemblies are used in tandem.

Figure 8:
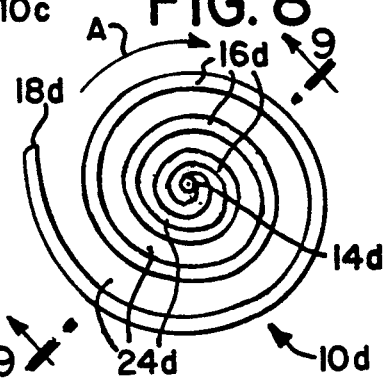
FIG. 8 is a top plan view of another spiral coil assembly.
Figure 9:
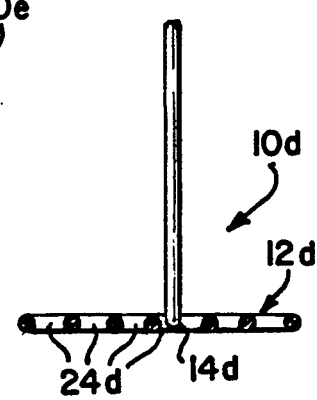
FIG. 9 is a sectional view taken along line 9—9 of FIG. 8.

Spiral coil assembly unit 10d of FIGS. 8 and 9 differ from coil unit 10 in that coil turns 16d, in contrast to turns 16, are progressively spaced more closely together from outer free end 18d to inner end 14d. Any plant stalks caught in coil unit 10d will be grasped, clumped and wedged more firmly into the narrowing channel 24d and thus be subjected to more tension.

Figure 10:
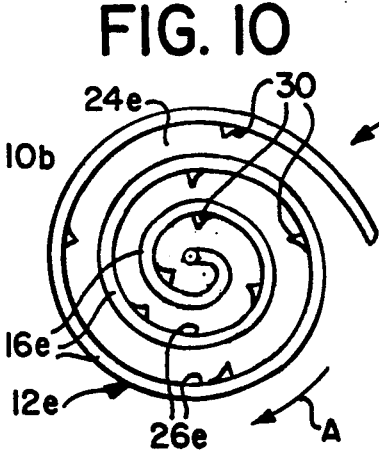
FIG. 10 is a top plan view of still another spiral coil embodiment with cutting blades attached.

FIG. 10 illustrates a helical coil assembly 10e identical to unit 10, except for the addition of small cutting blades 30, which are spaced along the inner surface 26e of coil 12e and faced inwardly toward channel 24e. Blades 30 are thus positioned to sever those plant growth stalks which are caught in channel 24e and are spun centripetally toward the center of coil 12e. When rotated at adequate speed, coil assembly 10e functions not as a tool for removing plant growths completely by the roots, as do coils 10a-10d, but does act as an effective mowing or trimming device, grasping the stalks, bundling and cutting them under tension with great efficiency.

Figure 11:
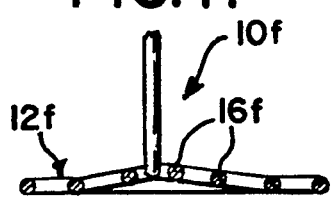
FIGS. 11 and 12 are each a sectional view of another spiral coil embodiment.
Figure 12:
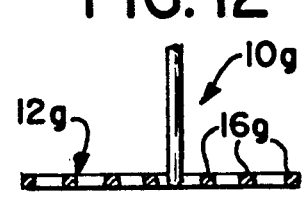

Coil assembly 10f of FIG. 11 varies from coil assembly 10 of FIGS. 1-3 in that, while still substantially planar, coil 12f's inner turns 16f are slightly offset in the direction of shaft 20f. Coil assembly 12g in FIG. 12 exhibits coil 12g, the cross-sectional shape of which is square, in contrast to the round shape of the coils in assemblies 10-10f. Conceivably, triangular, rectangular, even hexagonal cross-sectional shapes may be used.

FIG. 13 illustrates a cutting or trimming device 32 useful in the practice of this invention. Here, rotating shaft 20h of helical coil assembly 10h is operatively held in the chuck 34 of rotating device 36, which may be in the form of an electric drill or similar unit powered either through electric cord 38 as shown, or by battery. Shaft 20h carries coil 12h not integrally, as in the previously described embodiments, but by means of collar 40 of coil 12h. Circular cutting blade 44 is also mounted on the end 42 of shaft 20h directly adjacent and below coil 12h, which is identical in configuration to coil 12f of FIG. 11. Thereby, blade 44 fits within the profile of centrally displaced coil 12h for safe and efficient handling of trimmer 32, which may be used effectively for trimming lawn edges, hedges, shrubs, even small tree branches.

Helical coil assembly 10i in FIG. 14 resembles coil assembly 10h of FIG. 13, but coil 12, which is mounted on end 42i of shaft 20i by means of collar 40i, is offset oppositely to coil 12h. Shaft 20i carries cutting blade 44i on the side of coil 12i away from shaft end 42i, blade 44i being positioned within the profile of coil 12i, similarly to the embodiment of FIG. 13.

A pedal-operated mower 50, utilizing spiral coil assemblies of this invention in tandem, is illustrated in FIGS. 15-17. FIG. 15 shows a tricycle-like drive apparatus 52, the supporting frame 54 of which has been simplified for clarity by omitting pedal frame support, seat and handlebars. Frame 54 carries rear steering wheel and bearings 58, which rotatably support front wheel axle 60 on which, in turn, wheels 62 are held. Pedal mechanism 64 drives chain or belt 66, pulley 68, and thus axle 60, wheels 62, as well as pulley 70, chain or belt 72 and gear mechanism 74.

Frame 54, at its forward end, supports moving assembly 76, which comprises a cluster of three helical coil assemblies 10j arranged in equilateral triangle formation and rotatably carried by triangular frame support 78. As best seen in FIG. 16, support platform 78 is mounted on three wheels 80, each rotatably suspended from a spring-equipped telescopic leg, one in each corner of platform 78, providing thereby cushioned travel of mowing assembly 76. Coil assemblies 10j each comprise concentric vertical shafts 20j and 84. Each hollow shaft 20j is supported rotatably in bearings 86 mounted in platform 78, carries helical coil 12j at its lower end and pulley 88 at its upper end. Pulley 88 is rotated in the clockwise direction of arrow A by belt 90 which in turn is activated by gear mechanism 74 through pulley 92. Each stepped solid shaft 84 is rotatably supported within concentric shaft 20j by bearing 94 and shaft 84 carries at its lower end circular cutting blade 44j removably held in place by washer 96 and by nut 98 threadedly engaging the lower end of shaft 84. Pulley 100, secured at the upper end of each solid shaft 84, is driven in the counterclockwise direction of arrow C by belt 102, pulley 104 and gear mechanism 74. Each outer shaft 20j is distorted adjacent its lower end, as shown in FIG. 16, to form a projecting portion 106, which, when rotated, serves as a diverter to prevent the plant stalks or blades of grass being moved from becoming entangled with shaft 20j above cutting blade 44j.

Gear mechanism 74 comprises pulley 108 driven by chain or belt 72 from drive apparatus 52. Pulley 108 in turn drives bevel gears 110, gear 112 and large meshing gear 114, which rotates shaft 116, pulley 92 mounted thereon and drive belt 90, all in a clockwise direction. Gear 114 also meshes with and drives smaller gear 118, and consequently pulley 104 and drive belt 102 in a counterclockwise direction at a faster speed than belt 90 is driven. Thus, each helical coil 12j and and associated cutting blade 44j are operated in opposite directions, with blade 44j traveling considerably faster than stalk-grasping coil 12j. The cutting of plant stalks under tension with inexpensive easily replaceable, therefore generally sharper, blades, using mowing apparatus 50, has been most efficient for mowing lawns and crops.

It is evident that helical coil assemblies as described above, with or without accompanying cutting blades, may be combined and utilized in many ways. The number, size, strength and distribution of multiple coils may be varied to suit the nature and strength of the plant growth to be mowed or removed, as well as the size of the area to be processed. An one example, FIG. 18 illustrates schematically a spiral coil combination 120 for home or commercial use, wherein two rows of intermittently spaced helical coil assemblies 10 are rotated simultaneously by a power source P through sprocket 122, chain 124 and individual sprockets 126. It may be noted that device 120 can function in any direction and, when cutting blades 30 (FIG. 10) or 44 (FIGS. 13-17) are employed, the resultant mower may be operated in conjunction with conventional attachments such as grass collectors or mulching devices in current use. Notable also is the fact that the cutting blades of this invention are, in contrast to the prior art, inexpensive and easy to sharpen or replace when necessary; that any power source—motor, engine or human—may be used to rotate the spiral coil assemblies; and that the power requirements to operate this type of apparatus efficiently are very significantly lower than comparable devices of the prior art, generating less or no noise and air pollution.

FIGS. 19-22 illustrate spiral coil assemblies wherein the helical coils are not integral with their associated shafts. In FIG. 19, the inner end of coil 12k extends upwardly and perpendicularly with respect to the plane of its coil to form connecting flange 128, which is secured to shaft 130 by means of screws 132 to form helical coil assembly 10k.

FIG. 20 shows helical coil assembly 10L, with spiral coil 12L, flange 128L and screws 132L identical to the corresponding elements in FIG. 19, but here fastened to stepped shaft 134. Shaft 134 removably carriers, at its lower end 136, cutting blade 44L, washer 96L and threadedly engaged nut 98L. In this embodiment, blade 44L rotates together with coil 12L in the same direction.

Coil assembly 10m of FIG. 21 has a series of coils 12m identical to coils 12k spacedly mounted along shaft 130m. Multiple coils positioned in this manner may be useful for removing stronger heavier plant stalks or even small tree branches.

For rotation of the cutting blade oppositely to that of the spiral coils, as in the apparatus of FIGS. 15-17, the embodiment of FIG. 22 is shown, wherein outer hollow shaft 138 supports coil 12n secured by coil flange 128n and screws 132n. Inner shaft 84n is supported concentrically within and by hollow shaft 138 and bearing 94n mounted therein. Lower end 140 of shaft 84n in threaded and holds cutting blade 44n, washer 96n and nut 98n in operative position.

Combinations, variations and substitutions in the series of preferred embodiments herein described are envisioned for the practice of this invention in the best mode now contemplated, and its concepts are limited only by the scope of the ensuing claims, wherein:

I claim:

1. Apparatus for the removal of plant growth, which comprises:
    at least one rigid helical coil, said helical coil generating and extending progressively outwardly from an inner centrally disposed point through a plurality of spaced turns to a free open outer end, the space between said plurality of spaced turns forming a channel merging at its outmost end into a channel access opening at said free outer end of each said coil, at least one of the surfaces of said plurality of coil turns facing said channel being serrated;
    a shaft connected at said inner centrally disposed point of each said helical coil, said shaft being positioned substantially perpendicularly to said spaced turns of each said helical coil; and
    means for rotating each said shaft in the direction of generation of each said helical coil, whereby the rotation of each said shaft in turn rotates each said coil so that each said channel access opening is on the leading edge of each said coil, facingly to engage, entrap and force any plant stalks in its path to be caught and spun centripetally into each said channel, grasped between and tensioned by said turns of each said helical coil.

2. Apparatus for removing plant growth as defined in claim 1, wherein each said helical coil is substantially planar.

3. Apparatus for removing plant growth as defined in claim 1, wherein said plurality of coil turns are evenly spaced and said channel in each said helical coil is thereby uniform in size.

4. Apparatus for removing plant growth as defined in claim 1, wherein said plurality of coil turns are so graduated in spacing that said channel is narrower at said inner centrally disposed point than at said access opening in each said helical coil.

5. Apparatus for removing plant growth as defined in claim 1, wherein the cross-sectional configuration of said coil turns in each said helical coil is selected from the group consisting of round, elliptical, ovate, square, triangular, rectangular and hexagonal.

6. Apparatus for removing plant growth as defined in claim 1, wherein each said shaft is integral with the corresponding said at least one helical coil, said shaft extending from said inner centrally disposed point of said at least one helical coil substantially perpendicularly to said coil.

7. Apparatus for removing plant growth as defined in claim 1, wherein said at least one helical coil is attached to its corresponding said shaft, said inner centrally disposed point of each said at least one helical coil having an extension projecting substantially perpendicularly to said coil, said extension of each said helical coil being fastened to each said shaft.

8. Apparatus for removing plant growth as defined in claim 1, wherein a plurality of said at least one helical coil and a plurality of corresponding said shafts may be operated in unison by said rotating means.

9. Apparatus for removing plant growth, which comprises:
    at least one rigid helical coil, each said helical coil generating and extending progressively outwardly from an inner centrally disposed point through a plurality of spaced turns to a free open outer end, the space between said plurality of of spaced turns forming a channel merging at its outmost end into a channel access opening at said free outer end of each said coil;
    a shaft connected at said inner centrally disposed point substantially perpendicularly to said spaced turns of each said helical coil;
    means for rotating each said shaft in the direction of generation of each said helical coil, whereby the rotation of each said shaft in turn rotates each said coil, so that each said channel access opening is on the leading edge of each said coil, facingly to engage, entrap and force any plant stalks in its path to be caught and spun centripetally into each said channel, grasped between and tensioned by said turns of each said helical coil; and
    cutting blade means, said blade means being positioned adjacent to said at least one helical coil to sever those stalks of plant growth entrapped and being forced centripetally inwardly along each said channel by the rotation of said helical coil, thus mowing, trimming and removing the plant growth extending above and beyond the path of said blade means.

10. Apparatus for removing plant growth as defined in claim 1, further comprising cutting blade means in the form of at least one flat blade fixed along said coil turns and projecting inwardly therefrom into said channel.

11. Apparatus for removing plant growth as defined in claim 9, wherein said cutting blade means is in the form of a flat disk-like blade, one said blade being removably mounted on each said shaft adjacent said at least one helical coil and rotatable therewith.

12. Apparatus for removing plant growth as defined in claim 11, wherein at least one of said turns in each of said at least one helical coil is slightly offset in the direction away from said flat disk-like blade to permit said blade to be positioned within the profile of said at least one helical coil.

13. Apparatus to remove plant growth as defined in claim 9, wherein an axial projection is provided on each said shaft, said projection being positioned on the lower portion of said shaft near said helical coil and rotatable therewith, whereby the upper portion of the plant stalks being cut are diverted and prevented from entangling with said rotating shaft.

14. Apparatus for trimming and mowing, which comprises:
at least one helical coil assembly, each comprising:
a rigid sustantially planar helical coil, said helical coil generating and extending from an inner point of origin through a plurality of spaced coil turns to a free outer end, the space between said spaced coil turns forming a channel merging into a channel access opening at said outer end of said helical coil;
a first shaft connected at said inner point of origin to said helical coil, said first shaft being hollow and being positioned substantially perpendicularly to said helical coil;
a second shaft, positioned concentrically within, for rotation with, and extending beyond, said hollow first shaft; and
a substantially flat disk cutting blade mounted removably on the extending end of said second shaft, said cutting blade being positioned parallelly and closely adjacent to said helical coil; and
means for rotating each said first hollow shaft of said at least one helical coil assembly in the direction of generation of said helical coil, and for rotating each said second cutting-blade-carrying shaft of said at least one helical coil assembly simultaneously but at a different rate.

15. Mowing and trimming apparatus as defined in claim 14, wherein said rotating means is capable of rotating each said cutting blade and said second shaft faster than the simultaneous slower opposite rotation of each said helical coil and said first shaft.

16. Mowing and trimming apparatus as defined in claim 14, wherein said plurality of spaced coil turns are evenly spaced, whereby said channel in each said helical coil is uniform in size.

17. Mowing and trimming apparatus as defined in claim 14, wherein at least one of the surfaces of said plurality of spaced coil turns facing into said channel is serrated.

18. Mowing and trimming apparatus as defined in claim 14, wherein said plurality of coil turns are so graduated in spacing that said channel is narrower at said inner point of origin than at said access opening in said helical coil.

19. Mowing and trimming apparatus as defined in claim 14, wherein a plurality of said helical coil assemblies may be combined and operated in unison by said rotating means.

* * * * *